United States Patent [19]

Maloney

[11] Patent Number: 4,599,190

[45] Date of Patent: Jul. 8, 1986

[54] COMPOSITION FOR DEINKING SECONDARY FIBERS

[75] Inventor: James E. Maloney, Eagan, Minn.

[73] Assignee: Diamond Shamrock Chemicals Company, Dallas, Tex.

[21] Appl. No.: 630,540

[22] Filed: Jul. 13, 1984

Related U.S. Application Data

[63] Continuation of Ser. No. 206,142, Nov. 12, 1980, abandoned, which is a continuation of Ser. No. 458,432, Jan. 17, 1983, Pat. No. 4,518,459, which is a continuation of Ser. No. 93,744, Nov. 13, 1979, abandoned.

[51] Int. Cl.$^4$ .................... C11D 1/72; D21C 5/02
[52] U.S. Cl. .................... 252/174.24; 252/174.21; 252/174.23; 252/DIG. 1; 252/DIG. 2
[58] Field of Search .......... 252/174.21, 174.23, 252/DIG. 1, DIG. 2, 174.24; 162/5, 72, 77, 158

[56] References Cited

U.S. PATENT DOCUMENTS

| | | | |
|---|---|---|---|
| 3,021,372 | 2/1962 | Dupre et al. | 252/174.21 |
| 4,043,908 | 8/1977 | Roberts et al. | 210/43 |
| 4,162,186 | 7/1979 | Wood et al. | 162/5 |
| 4,184,912 | 1/1980 | Payton | 162/72 |
| 4,347,099 | 8/1982 | DeCeuster et al. | 162/5 |
| 4,445,971 | 5/1984 | Lappi et al. | 162/158 |

FOREIGN PATENT DOCUMENTS 729071 3/1966 Canada.
197607 7/1976 Japan.

OTHER PUBLICATIONS

U.S. patent application Ser. No. 458,432, (filed Jan. 17, 1983).
The "Condensed Chemical Dictionary", G. G. Hawley, ed. (p. 858).

Primary Examiner—Prince E. Willis

[57] ABSTRACT

Improvements in washing methods of deinking secondary fiber wherein substituted oxyethylene glycol nonionic surfactants are employed in the aqueous deinking medium, the improvement being the addition to the deinking medium of water soluble, low molecular weight polyelectrolyte dispersants, preferably of the structure

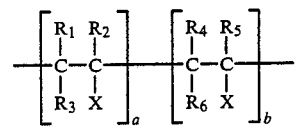

wherein $R_1$, $R_2$, $R_4$ and $R_5$ are independent and can be hydrogen, $C_1$–$C_4$ lower alkyl, alkylcarboxy (e.g., —$CH_2COOH$) or mixtures thereof; $R_3$ and $R_6$ can be hydrogen, carboxy, alkylcarboxy, or mixtures thereof, and X can be carboxy (including salts or derivatives thereof, e.g., amide), acetyl, or hydrocarbon moieties commonly attached to free radical polymerizable monomers (e.g., —$C_6H_5$ in styrene); a+b having a value in the range of 15 to about 1,000.

Polymers comprising polyacrylates constitute a particularly preferred class of polyelectrolytes for use in the present improved method.

6 Claims, No Drawings

COMPOSITION FOR DEINKING SECONDARY FIBERS

This is a continuation of application Ser. No. 206,142, filed Nov. 12, 1980, now abandoned, which is a continuation of application Ser. No. 458,432, filed Jan. 17, 1983, now U.S. Pat. No. 4,518,459, which is in turn a continuation of application Ser. No. 93,744, filed Nov. 13, 1979, now abandoned.

BACKGROUND OF THE INVENTION

This invention relates to improvements in methods of deinking or decontaminating secondary (i.e., not virgin or primary) cellulosic fiber or fiber sources. More particularly, the present invention relates to improvements in washing methods of deinking recycled cellulose fiber, and especially to those washing methods which employ aqueous deinking media comprising substituted oxyethylene glycol nonionic surface active agents (surfactants).

INCORPORATION BY REFERENCE

This invention is an improvement upon the invention described in commonly assigned U.S. Pat. No. 4,518,459, the entire disclosure of which is incorporated by reference herein.

The invention of U.S. Pat. No. 4,518,459 relates to washing methods of deinking secondary fiber and to the use of substituted oxyethylene glycol nonionic surfactants in such washing-type deinking methods. Washing methods of deinking are distinguished from flotation deinking methods which are more technically involved and which generally require more capital investment. The substituted oxyethylene glycol nonionic surfactants described and claimed in U.S. Pat. No. 4,518,459 provide enhanced deinking performance (vis-a-vis, conventional washing deinking methods) with unexpected low foaming throughout wide variation in deinking or processing temperature.

The present invention also contemplates the avoidance or mitigation of the drawbacks of conventional washing-type deinking methods while obtaining the advantages of those methods, particularly as compared to the more complicated, more capital-intensive, and more sensitive flotation methods. This improvement is based upon the discovery of a particular class of dispersants which unexpectedly enhance the deinking performance of the substituted oxyethylene glycol surfactants of U.S. Pat. No. 4,518,459. The present dispersants provide nearly complete removal of troublesome, water insoluble (usually thermoplastic), secondary fiber contaminants such as fillers, pigments, coatings and sizes. As will be discussed below, the enhanced performance provided by the present invention is seen in increased handsheet brightness and in substantially reduced (if not eliminated) deposition of objectionable contaminants on processing machinery.

SUMMARY OF THE INVENTION

The present invention provides an improved washing method in which a combination of particular nonionic surfactants and dispersants provide both foam control (e.g., defoaming effects), high deinking efficiency, enhanced handsheet brightness and unexpected restriction of contaminant deposition.

Briefly, in one aspect, the present invention is an improvement in washing-type deinking processes which employ an aqueous media comprising substituted oxyethylene glycol, the improvement being the addition to the aqueous media of water soluble, low molecular polyelectrolyte dispersants. A preferred class of water soluble, polyelectrolyte dispersants for use herein is the polyacrylates.

In a further aspect, the present invention contemplates the use of described solvents or cosolvents with the polyelectrolytes to provide even greater enhancement of overall deinking efficiency.

For purposes of the present invention, the following terms shall be defined:

"Washing-type" or "washing" deinking methods shall mean methods for producing substantially decontaminated secondary fiber comprising suspending the secondary fiber in an aqueous medium, the aqueous medium being heated to a temperature in the range of about 25° C. to about 85° C., preferably 35°–60° C., in the presence of a surface active agent comprising substituted oxyethylene glycol and substantially separating the decontaminated fiber from the contaminant-containing aqueous medium by means of washing-type steps.

"Substituted oxyethylene glycol surfactants" herein shall mean nonionic surfactants comprising oxyethylene glycol chain wherein one terminal hydroxyl of the chain has been replaced with an aliphatic or alkylaromatic ether group, and the other terminal hydroxyl has been replaced with a polyoxypropylene group or a benzyl ether group.

"Low molecular weight" herein shall mean having a molecular weight in the range of 500 to 50,000.

"Water soluble" as the term is intended herein means any material that substantially dissolves in water at room temperature to form a solution.

DETAILED DESCRIPTION OF THE INVENTION

In the usual practice of the process of which this invention is an improvement, contaminated secondary fiber is blended with water and substituted oxyethylene glycol surfactant, thereby causing contaminants to separate from the fiber and become uniformly distributed throughout the aqueous fiber slurry or medium. The decontaminated fiber is then substantially separated or isolated from the contaminated aqueous medium, e.g., by centrifuging, decanting, filtering, or preferably, screening. The separation or recovery of the decontaminated fiber from the aqueous medium can be proceeded by a concentration or dilution step and can be followed by additional washing-type steps, e.g., dilution and/or screening, which steps can be accompanied by agitation of dilute fiber slurries. It is particularly preferred in this invention that the deinking begin with the repulping of the secondary fiber, i.e., that the surfactant and dispersant used in this invention be present during the repulping step. However, the present dispersants can also be added downstream from the repulping including sidehill washer stages and/or to the caustic extraction stage of a bleaching system.

During separation of decontaminated fiber, contaminant build-up on processing machinery has been experienced particularly where efforts were made to decontaminate paper having increased water resistance (e.g., wax coated papers such as in cold cups). In high contaminant deinking environments, some contaminant deposition was found to occur even when the advantageous substituted oxyethylene glycol surfactants of U.S. Pat. No. 4,518,459 were utilized.

In a practice of the present invention, the addition of water soluble, low molecular weight polyelectrolyte dispersants to the deinking milieu containing the substituted oxyethylene glycols produced a completely unexpected and unpredicted improved dispersion of the contaminants into the processing medium.

This improved dispersion of the contaminants into the aqueous deinking medium resulted in substantially reduced deposition of the objectionable materials on processing machinery thus reducing machinery downtime. The low molecular weight polyelectrolytes described herein provide enhanced deinking of secondary fiber containing coatings such as wax, fillers, pigments such as carbon black, calcium carbonate, organic resins. Without being bound to any theory, the present dispersants are thought to restrict the formation of contaminant agglomerates, thus permitting the easier removal of contaminants (after repulping) in separation step.

Further, the polyelectrolyte dispersants herein tend to prevent (by preferential complexation) the formation of certain insoluble reaction products formed between ions of metals such as calcium and magnesium and the organic materials commonly present in secondary fiber such as fatty acids (a major constituent of printing inks), resin, casein and starch. Such insoluble, hard water reaction products are analogous to the familiar bath tub or hard water deposit.

The present improvement involves the use of polyelectrolyte dispersants. "Polyelectrolyte dispersants" as the term is intended herein means any homo, co, ter, etc., polymer of the structure,

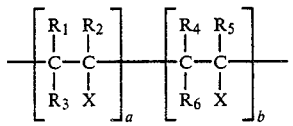

wherein $R_1$, $R_2$, $R_4$ and $R_5$ are independent and can be hydrogen, $C_1$-$C_4$ lower alkyl, alkylcarboxy (e.g., —CH$_2$COOH) or mixtures thereof; $R_3$ and $R_6$ can be hydrogen, carboxy, alkylcarboxy, or mixtures thereof, and X can be carboxy (including salts or derivatives thereof, e.g., amide), acetyl, or hydrocarbon moieties commonly attached to free radical polymerizable monomers (e.g., —C$_6$H$_5$ in styrene); a+b having a value in the range of 15 to about 1,000.

Examples of materials within the scope of the above formula include polymaleic acid, polyacrylic acid, polymethacrylic acid, polyacrylic acid/itaconic acid copolymers, polyacrylic acid/hydrolyzed maleic acid copolymers, polymaleic acid/itaconic acid copolymers, hydrolyzed polymaleic acid/vinyl acetate copolymers, polyacrylic acid/acrylamide copolymers, polyacrylic acid/methacrylic acid copolymers, styrene/maleic acid copolymers, sulfonated styrene/maleic acid copolymers, polymaleic acid/methacrylic acid copolymers, maleic acid telomers, maleic/alkyl sulfonic copolymers.

A particularly preferred class of water soluble polyelectrolytes for use in the practices of the present invention is the polyacrylates. The polyacrylates comprise polymers and copolymers of the structure:

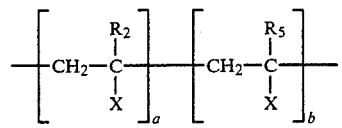

wherein $R_2$, $R_5$, X, a and b are defined as above.

In a most preferred practice of the present invention, X is —COOZ, wherein Z is H, or a monovalent cation, e.g., Na$^+$, K$^+$, or NH$_4^+$. Thus, typical most preferred polyelectrolytes of the present invention are polyacrylic acid (e.g., GOODRITE K732 available from B. F. Goodrich Company), polymethacrylic acid (e.g., TAMOL 850, available from Rohn & Haas), and copolymers of acrylic acid/methacrylic acid (e.g., AQUATREAT available from ALCO Chemical).

The polyelectrolytes of this invention must be water soluble. Generally speaking, to be water soluble, the polymer must contain sufficient polar groups (e.g., COOH) for the molecule to interact with the polar water molecules. This means that in copolymers, terpolymers, tetramers, etc., with unsaturated monomers which are predominantly or entirely hydrocarbon (e.g., styrene) there must be sufficient polar functional groups for the polymer to dissolve in room temperature or below water. Generally, at least about 10 mole percent of the monomers comprising the polymer must contain polar functionality (e.g.,

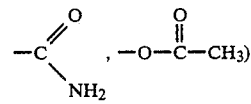

to provide the required water solubility.

The low molecular weight polyelectrolytes of present invention generally have molecular weights of less than about 50,000 with preferred molecular weights in the range of about 500 to 25,000, most preferably of 750 to 5,000. Thus, the sum of a+b above, generally falls in range of 5 to 1,000, preferably 10 to 500 and most preferably 12 to 450. One skilled in the art will recognize that the materials within the above molecular weight ranges are generally of lower molecular weight than polymers generally referred to in the art as flocculants which may have molecular weights in the range of several million or more. Flocculants perform function of agglomerating suspended particles opposite the desired function of dispersion described herein. Thus, these high molecular weight materials operate in a manner effectively opposite that of the materials described herein. The lower molecular weight materials of the present invention are generally referred to in the art as "dispersants".

Functionally speaking, the polyelectrolytes of this invention should be present in the aqueous surfactant mixture to the extent necessary to prevent deposition of contaminants (e.g., pigments, coatings, fillers, etc.) onto processing equipment. Generally, the concentrations of the present polyelectrolytes falls in the range of about 5 to about 500 parts per million, with concentrations in the range of about 10 to about 75 ppm being preferred.

Another area where the present invention is found to be particularly effective is in the area of deinking secondary fiber having photocopying inks therein, (i.e., recycled photocopies). Photocopies are made on coated or uncoated papers, the coated papers having various materials thereon (and therein) to enhance the ability of the paper to accept and permanently retain Xerographic imaging powders. Photocopy paper coatings and sizes and the imaging powder itself tend to be suspended during the repulping step (i.e., to be held in the solution primarily by physical agitation of the liquid) only to be deposited on processing machinery as a result of eventual coagulation or as the aqueous processing stream cools and/or is less aggressively agitated. Use of the polyelectrolytes described herein (in conjunction with the substituted oxyethylene glycols) tends to reduce or substantially eliminate such deposition.

Yet another area where the present invention finds utility in the deinking or newsprint. Recycled newsprint is distinguishable from other secondary fiber sources because the printing ink used is printed directly on uncoated fiber. In other secondary fiber sources the print is on a coated fiber (i.e., not directly on the fiber itself). The difficulty with deinking of newsprint is increased by the fact that newsprint can be up to 12% to 14% by weight printing ink which is essentially all relatively hard-to-disperse carbon black. Given the quantity and availability of recycled newsprint, efficient newsprint deinking methods are a desideratum of the secondary fiber industry of the highest order.

The improvement of the present invention optionally contemplates the use of various well-known water soluble solvents or cosolvents (along with the dispersants). Particularly preferred examples of such solvents include tetrahydrofuran, tetrahydrofufural alcohol, and ethoxylated and propoxylated derivatives thereof.

The following non-limiting examples are intended to illustrate the practice of the present invention and should not be used to limit its scope.

EXAMPLE 1

The deinking or decontamination of wax coated paper consumer "cold cups" or drink cups to produce handsheets was accomplished on a laboratory scale using the standard deinking formula of Table IA. Repulping of cold cups was accomplished in a pulper (under moderate agitation) at 160° F. (71° C.) for 60 minutes.

TABLE IA

| Material | Amount |
|---|---|
| Water | 250 ml |
| Fiber stock (to be deinked) | 18.8 g |
| Chlorine dioxide (10%) | 1.9 ml |
| NaOH (50% aqueous solution) | 0.4 ml |
| Substituted oxyethylene glycol (10%)* | 1.9 ml |
| Solvent | 0.4 ml |

*$C_{10-14}$ alcohol-(ethylene oxide)$_{20}$-$CH_2$—$C_6H_5$

Various solvents were employed as listed in Table IB.

TABLE IB

SOLVENTS 1. 50 weight percent kerosene 50 weight percent aromatic naphtha with a nonylphenyl-$(EO)_6$—OH emulsifier.
2. butyl "CARBITOL" (diethylene glycol monobutylether)
3. "PENTOXONE" (4-methoxy-4 methyl-pentanone available from Shell Chemical Co.)
4. tetrahydrofuran (available from Quaker Oates Chemical Company)
5. mono ethoxylated tetrahydrofurfuryl alcohol (also available from Quaker Oates Company)

Handsheets prepared from the deinking cold cups were found to have improved brightness but were found to generate a heavy colored wax buildup on the equipment (i.e., on the inside of the glass beakers). It was then decided that sovent number 1 (viz., the mixture of kerosene and aromatic naphtha) would be employed and various dispersants would be added to the deinking composition at the level of 12 parts per million. The dispersants employed are listed in Table IC. Dispersants in Table IC numbered 1a, 2a and 3a are within the scope of the present invention.

TABLE IC

DISPERSANTS

1a. Aqueous solution of 15 weight percent "DEQUEST 2054" (see 5 below), 12 weight percent of 50/50 mole percent copolymer of hydrolyzed maleic anhydride and vinyl acetate having a molecular weight of about 3,000.

2a. 50/50 mole percent copolymer of hydrolyzed maleic anhydride and vinyl acetate having a molecular weight of about 3,000 (50% active).

3a. Polyacrylic acid having a molecular weight of about 3,000 (e.g., GOODRITE K732, commercially available from B. F. Goodrich Co.) (50% active).

4a. Ethylene diamine tetraacetic acid, sodium salt aqueous solution, 40% active (e.g., VERSENE 100 available from Dow Chemical Co.).

5a. Hexamethylenediamine tetramethylenephosphonate, hexapotassium salt aqueous solution, 36% active (e.g., "DEQUEST" 2054 available from Monsanto Company).

Handsheets were prepared utilizing the above compositions, their Hunter brightness being determined. The results of this evaluation appear in Table ID. Table ID indicates that the best combination of solvent and dispersant within the scope of this invention (i.e., the combination which provides the best reduction of wax deposit and brightness enhancement) is the tetrahydrofurfuryl alcohol solvent (straight and 9EO) used in conjuction with polyacrylic acid dispersant having molecular weight of about 3,000.

TABLE ID

| SOLVENT | DISPERSANT | WAX DEPOSIT | BRIGHTNESS (HUNTER) | | | WHITENESS | WHITENESS OR DELTA WHITENESS |
|---|---|---|---|---|---|---|---|
| | | | Y | X | Z | | |
| 1 | None | Heavy | 81.9 | 81.1 | 84.0 | 66.4 | 25.0 |
| 5 | None | Heavy | 84.7 | 83.5 | 89.7 | 72.0 | 19.4 |
| 2 | None | Heavy | 84.0 | 83.4 | 88.4 | 70.7 | 20.8 |
| 3 | None | Heavy | 83.5 | 83.0 | 87.5 | 69.8 | 21.7 |
| 4 | None | Heavy | 85.0 | 83.6 | 89.9 | 71.9 | 19.6 |
| 1 | 1a | None | 83.3 | 83.0 | 88.2 | 71.6 | 19.5 |
| 1 | 5a | Heavy | 84.7 | 83.7 | 90.4 | 73.3 | 18.1 |
| 1 | 2a | None | 83.4 | 81.4 | 87.9 | 70.8 | 20.7 |

TABLE ID-continued

| | | | BRIGHTNESS (HUNTER) | | | | |
|---|---|---|---|---|---|---|---|
| SOLVENT | DISPERSANT | WAX DEPOSIT | Y | X | Z | WHITE-NESS | WHITENESS OR DELTA WHITENESS |
| 1 | 4a | Some | 87.3 | 85.2 | 93.8 | 75.9 | 15.6 |
| 1 | 3a | None | 85.1 | 84.2 | 91.7 | 75.2 | 16.2 |
| THFA 9EO* | 3a | None | 87.7 | 85.7 | 95.6 | 78.4 | 13.1 |
| THFA** | 3a | None | 86.6 | 84.6 | 93.8 | 77.0 | 14.5 |

*Tetrahydrofurfural alcohol with 9 moles of ethylene oxide (EO) condensed thereon.
**Tetrahydrofurfural alcohol.

EXAMPLE 2

Secondary fiber having Xerographic ink and/or electrostatic coatings thereon were deinked and handsheets prepared therefrom, the brightness values of the resulting handsheets being shown in Table II. The family of substituted oxyethylene glycols indicated in Table II are the nonyl phenol-polyethylene (EO) oxide nonionic surfantants, there being an average of 9.5 moles of ethylene oxide per mole of nonylphenol. Additionally, various amounts of propylene oxide (PO) were condensed on the ethylene oxide chain to provide substituted oxyethylene glycol nonionic surfactants with different deinking properties. The remainder of the composition used to obtain the brightness values for the handsheets indicated in Table II was 250 milliliters water, 15 grams Xerographic coated paper stock, 0.09 grams 50% NaOH. The substituted oxyethylene glycol was added to the extent of 0.04 ml and the co-solvent (where added) was added to the extent of 0.4 ml (two handsheets were prepared for each example, the brightness values indicated being an average for the two sheets).

Table II indicates that the nonylphenol ethoxylates are good deinkers of Xerographic grade secondary fiber. Those nonylphenol ethoxylates with more propylene oxide were found to be slightly better in their performance than those with less. Further, polyacrylic acid dispersant having a molecular weight of about 3,000 was found to provide enhanced deinking performance, vis-a-vis, the same composition without such a dispersant. Lastly, in contrast with the paper grades having wax coatings thereon, deinking of Xerographic grade papers was enhanced only slightly by the addition of a co-solvent.

TABLE II

| SUBSTITUTED OXYETHYLENE GLYCOL | DISPER-SANT | CO-SOL-VENT | HUNTER REFLEC-TOMETER BRIGHTNESS VALUES | | |
|---|---|---|---|---|---|
| | | | X | Y | Z |
| nonylphenol (EO)$_{9.5}$—OH | None | None | 77.8 | 78.4 | 91.9 |
| nonylphenol (EO)$_{9.5}$—(PO)$_6$—OH | None | None | 78.8 | 80.1 | 92.6 |
| nonylphenol (EO)$_{9.5}$—(PO)$_{12}$—OH | None | None | 79.4 | 80.4 | 94.6 |
| nonylphenol (EO)$_{9.5}$—(PO)$_{24}$—OH | None | None | 80.0 | 80.6 | 95.0 |
| nonylphenol (EO)$_{9.5}$—(PO)$_{24}$—OH | 2a | None | 80.7 | 81.4 | 97.3 |
| nonylphenyl (EO)$_{9.5}$—(PO)$_{24}$—OH | 3a | None | 82.4 | 83.1 | 99.6 |
| nonylphenol (EO)$_{9.5}$—(PO)$_{24}$—OH | 3a | butyl carbitol | 82.6 | 83.3 | 99.4 |
| nonylphenyl (EO)$_{9.5}$—(PO)$_{24}$—OH | 3a | tetra-hydro-furfuryl alcohol | 81.8 | 82.5 | 99.7 |

EXAMPLE 3

Newsprint was deinked using various combinations of deinking surfactant, dispersant and cosolvent. The newsprint was repulped as described in Example 1. The standard deinking/repulping medium employed was as follows:

Water: 500 ml
Sodium metasilicate: 0.5 g
Newsprint: 25.0 g
Substituted oxyethylene glycol: 0.4 gm
Dispersant: 25 ppm
Cosolvent (when added): 0.3 gm The brightness (Hunter Reflectometer values) of handsheets prepared from the deinked newsprint are shown in Table III.

TABLE III

| SUBSTITUTED OXYETHYLENE GLYCOL | DISPERSANT | COSOLVENT | BRIGHTNESS (HUNTER Z VALUE) |
|---|---|---|---|
| nonylphenol-(EO)$_{9.5}$—OH | None | None | 58.8 |
| nonylphenol-(EO)$_{9.5}$—(PO)$_6$—OH | None | None | 54.6 |
| nonyphenol-(EO)$_{9.5}$—(PO)$_{24}$OH | None | None | 51.7 |
| nonylphenol-(EO)$_{9.5}$—(PO)$_6$—OH | 2a | None | 55.5 |
| nonylphenol-(EO)$_{9.5}$—(PO)$_6$—OH | 3a | None | 52.7 |
| nonylphenol-(EO)$_{9.5}$—(PO)$_6$—OH | 3a | butyl carbitol | 56.1 |
| nonylphenol-(EO)$_{9.5}$—(PO)$_6$—OH | 3a | THFA | 54.2 |
| nonylphenol-(EO)$_{9.5}$—(PO)$_6$—OH | 3a | THFA—EO—OH | 53.8 |
| nonylphenol- | | | |

| SUBSTITUTED OXYETHYLENE GLYCOL | DISPERSANT | COSOLVENT | BRIGHTNESS (HUNTER Z VALUE) |
|---|---|---|---|
| $(EO)_{9.5}$—$(PO)_6$—OH | | | |

What is claimed is:

1. A deinking medium for use in an aqueous washing method for deinking secondary fiber comprising water, 5–500 ppm of a water-soluble polymeric polyelectrolyte dispersant of the formula:

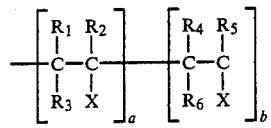

wherein $R_1$, $R_2$, $R_4$ and $R_5$ are H, $C_1$–$C_4$ lower alkyl, alkylcarboxy or mixtures thereof, $R_3$ and $R_6$ are H, carboxy, alkylcarboxy or mixtures thereof, and X is carboxy, $CO_2NH_2$, acetyl or $C_6H_5$ wherein a+b has a value so that the molecular weight of the polyelectrolyte dispersant is within the range of about 500–5,000; and an amount of a nonionic surfactant of the formula: nonylphenol$(EtO)_{9.5}(PrO)_{6-24}$-H effective to deink said fiber.

2. The deinking medium of claim 1 wherein the dispersant comprises a polyacrylate or a maleic acid-vinyl acetate copolymer.

3. The deinking medium of claim 2 wherein the molecular weight of the dispersant is about 750–3000.

4. The deinking medium of claim 1 further comprising a water-soluble cosolvent.

5. The deinking medium of claim 4 wherein the cosolvent is tetrahydrofurfuryl alcohol or ethoxylated derivatives thereof.

6. The deinking medium of claim 4 wherein the cosolvent is monoethoxylated-tetrahydrofurfuryl alcohol.

UNITED STATES PATENT AND TRADEMARK OFFICE
CERTIFICATE OF CORRECTION

PATENT NO. : 4,599,190
DATED : July 8, 1986
INVENTOR(S) : James E. Maloney et al.

It is certified that error appears in the above-identified patent and that said Letters Patent are hereby corrected as shown below:

On the title page, after [75] Inventor: James E. Maloney, Eagan, Minn. insert --; Richard E. Freis, Bloomington, Minnesota; Thomas R. Oakes, Stillwater, Minnesota--.

Signed and Sealed this

Fourteenth Day of October, 1986

[SEAL]

Attest:

DONALD J. QUIGG

Attesting Officer

Commissioner of Patents and Trademarks